(12) United States Patent
Kim (10) Patent No.: US 12,092,491 B2
(45) Date of Patent: Sep. 17, 2024

(54) APPARATUS FOR SENSING DISPLACEMENT OF BRAKE PEDAL

(71) Applicant: HL MANDO CORPORATION, Gyeonggi-do (KR)

(72) Inventor: Byung Ki Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 298 days.

(21) Appl. No.: 17/607,866

(22) PCT Filed: Apr. 29, 2020

(86) PCT No.: PCT/KR2020/005808
§ 371 (c)(1),
(2) Date: Oct. 30, 2021

(87) PCT Pub. No.: WO2020/222581
PCT Pub. Date: Nov. 5, 2020

(65) Prior Publication Data
US 2022/0205812 A1 Jun. 30, 2022

(30) Foreign Application Priority Data
May 2, 2019 (KR) .................. 10-2019-0051747

(51) Int. Cl.
*G01D 5/14* (2006.01)
(52) U.S. Cl.
CPC .......... *G01D 5/145* (2013.01); *B60T 2220/04* (2013.01)
(58) Field of Classification Search
None
See application file for complete search history.

(56) References Cited

U.S. PATENT DOCUMENTS 8,978,457 B2 * 3/2015 Naether .................. B60T 7/042
73/129
9,266,517 B2 * 2/2016 Knechtges .............. B60T 17/22
(Continued)

FOREIGN PATENT DOCUMENTS

| CN | 102431492 | 5/2012 |
| CN | 103097197 | 5/2013 |

(Continued)

OTHER PUBLICATIONS

International Search Report for PCT/KR2020/005808 mailed on Aug. 21, 2020 (now published as WO 2020/222581) with English translation provided by WIPO.

(Continued)

*Primary Examiner* — Jermele M Hollington
(74) *Attorney, Agent, or Firm* — Womble Bond Dickinson (US) LLP (57) ABSTRACT

Provided is an apparatus for sensing a displacement of a brake pedal, the apparatus including: a shaft extending parallel to a movement direction of a piston of a master cylinder displaced by an operation of the brake pedal; a magnet supported by the shaft; a mounting member configured to couple the piston and the shaft; and a sensor configured to detect a change in magnetic force by the magnet, wherein the shaft and the magnet are accommodated in a shaft bore formed through or formed to be recessed in a hydraulic block including a plurality of passages and valves which control flow of a pressing medium, and the shaft bore communicates with a cylinder bore formed in the hydraulic block and receiving the piston.

13 Claims, 6 Drawing Sheets

(56) References Cited

U.S. PATENT DOCUMENTS

| | | | |
|---|---|---|---|
| 9,527,485 B2 | 12/2016 | Nakamura et al. | |
| 10,877,507 B2* | 12/2020 | Lee | B60T 7/06 |
| 11,358,577 B2* | 6/2022 | Ahn | B60T 13/167 |
| 2013/0205881 A1* | 8/2013 | Naether | B60T 13/52 |
| | | | 73/121 |
| 2014/0331758 A1* | 11/2014 | Sim | B60T 7/06 |
| | | | 73/132 |
| 2017/0021813 A1* | 1/2017 | Tandler | B60T 8/368 |
| 2017/0282880 A1 | 10/2017 | Nakamura | |
| 2019/0100173 A1* | 4/2019 | Hong | B60T 7/042 |
| 2024/0101096 A1* | 3/2024 | Ha | G01D 5/145 |

FOREIGN PATENT DOCUMENTS

| | | |
|---|---|---|
| CN | 104149758 | 11/2014 |
| CN | 206862277 | 1/2018 |
| CN | 109572638 | 4/2019 |
| DE | 10 2010 045 617 | 3/2012 |
| DE | 10 2015 213 569 | 1/2017 |
| EP | 2 881 292 | 6/2015 |
| JP | 2014-8891 | 1/2014 |
| KR | 10-1759267 | 7/2017 |
| KR | 10-1801536 | 11/2017 |
| KR | 10-2019-0037544 | 4/2019 |

OTHER PUBLICATIONS

Written Opinion of the International Searching Authority for PCT/KR2020/005808 mailed on Aug. 21, 2020 (now published as WO 2020/222581) with English translation provided by Google Translate.

Extended European Search Report dated May 9, 2022 for European Patent Application No. 20799415.3.

International Preliminary Report on Patentability (Chapter I) for PCT/KR2020/005808 issued on Nov. 2, 2021 and its English translation from WIPO (now published as WO2020/222581).

Office Action dated Sep. 18, 2023 for Korean Patent Application No. 10-2019-0051747 and its English translation from Global Dossier.

Office Action dated Sep. 28, 2023 for Chinese Patent Application No. 202080032437.7 and its English machine translation by Google Translate.

* cited by examiner

APPARATUS FOR SENSING DISPLACEMENT OF BRAKE PEDAL

CROSS-REFERENCE TO RELATED APPLICATIONS

This application is the national stage of International Application No. PCT/KR2020/005808, filed on Apr. 29, 2020, which claims priority, under 35 U.S.C. 119 (a), to Korean Patent Application No. 10-2019-0051747 filed on May 2, 2019, the disclosures of which are incorporated by reference herein in their entireties.

TECHNICAL FIELD

The disclosure relates to an apparatus for sensing a displacement of a brake pedal, and more specifically, to a sensing apparatus capable of effectively measuring a displacement or a stroke of a brake pedal with a simple structure and installation.

BACKGROUND ART

A vehicle is equipped with a brake system for braking. Various types of brake systems have been proposed for more stable and effective braking force according to a variety of operating conditions of a vehicle.

In general, in a conventional brake system, when a driver presses a brake pedal, hydraulic pressure for braking is supplied to wheel cylinders using a mechanically connected booster. Recently, however, an electronic brake system that enables a precise control of braking force has come into widespread use. In the electronic brake system, once a driver operates a brake pedal, a pedal stroke sensor or a pedal travel sensor detects a displacement of the brake pedal, and an electrical signal indicating the driver's braking intention is received from the sensor, such that hydraulic pressure required for braking is supplied to wheel cylinders.

Such pedal stroke sensor is installed on a side of the brake pedal or a master cylinder connected thereto, and detects a displacement of the brake pedal that is translated or rotated by a pedal effort. However, an installation position of the pedal stroke sensor is required to be individually adjusted depending on a shape or structure of a vehicle, or a size of a brake pedal assembly increases depending on the installation position, leading to a reduced space efficiency of the vehicle and disruption of installation and application of the sensor.

DISCLOSURE

Technical Problem

An embodiment of the disclosure provides an apparatus for sensing a displacement of a brake pedal that may effectively detect the displacement of the brake pedal with a simple structure.

An embodiment of the disclosure provides an apparatus for sensing a displacement of a brake pedal that may reduce a manufacturing cost by improving ease of assembly and installation.

An embodiment of the disclosure provides an apparatus for sensing a displacement of a brake pedal that may be easily installed in vehicles of various shapes and structures.

An embodiment of the disclosure provides an apparatus for sensing a displacement of a brake pedal that may reduce a size of a brake pedal and master cylinder assembly.

An embodiment of the disclosure provides an apparatus for sensing a displacement of a brake pedal that may reduce a size of a brake pedal and master cylinder assembly.

According to an aspect of the disclosure, there is provided an apparatus for sensing a displacement of a brake pedal, the apparatus including: a shaft extending parallel to a movement direction of a piston of a master cylinder displaced by an operation of the brake pedal; a magnet supported by the shaft; a mounting member configured to couple the piston and the shaft; and a sensor configured to detect a change in magnetic force by the magnet, wherein the shaft and the magnet are accommodated in a shaft bore formed through or formed to be recessed in a hydraulic block including a plurality of passages and valves which control flow of a pressing medium, and the shaft bore communicates with a cylinder bore formed in the hydraulic block and receiving the piston.

The apparatus further including: a housing provided on a side where the shaft bore and the cylinder bore are formed on the hydraulic block.

The housing includes a receiving groove provided to receive at least a portion of the shaft or the magnet.

The mounting member includes a first coupling hole formed through one side to which the piston is coupled, and a second coupling hole formed through another side to which the shaft is coupled.

A plurality of magnets are disposed in the movement direction of the piston, and the apparatus further includes a gap forming member disposed among the plurality of magnets.

The apparatus further including: a cover member configured to cover the magnet and the gap forming member.

The shaft includes a coupling groove where the second coupling hole is seated and a support part extending outwardly from one end of the coupling groove to support the mounting member.

The apparatus further including: a flange part extending outwardly from the piston to support the mounting member.

The flange part is provided integrally with the piston.

The housing includes a through hole through which the piston passes.

The apparatus further including: a sealing member provided between the piston and the through hole.

The shaft bore extends parallel to the movement direction of the piston in the hydraulic block.

The sensor is mounted on an outer surface of the hydraulic block.

Advantageous Effects

The apparatus for sensing a displacement of a brake pedal according to an embodiment of the disclosure can be easily assembled and installed due to a simple structure.

The apparatus for sensing a displacement of a brake pedal according to an embodiment of the disclosure can reduce a manufacturing cost by reducing labor and time for assembly and installation.

The apparatus for sensing a displacement of a brake pedal according to an embodiment of the disclosure can be easily installed in vehicles of various shapes and structures.

The apparatus for sensing a displacement of a brake pedal according to an embodiment of the disclosure can improve ease of installation and a space efficiency of a vehicle by reducing a size of a brake pedal and master cylinder assembly.

The apparatus for sensing a displacement of a brake pedal according to an embodiment can improve a performance and reliability of a product.

BEST MODES OF THE DISCLOSURE

Hereinafter, embodiments of the present disclosure will be described in detail with reference to the accompanying drawings. The following embodiments are provided to fully convey the spirit of the disclosure to a person having ordinary skill in the art to which the present disclosure belongs. The disclosure is not limited to the embodiments shown herein but may be embodied in other forms. The drawings are not intended to limit the scope of the disclosure in any way, and the size of components may be exaggerated for clarity of illustration.

Figure 1:
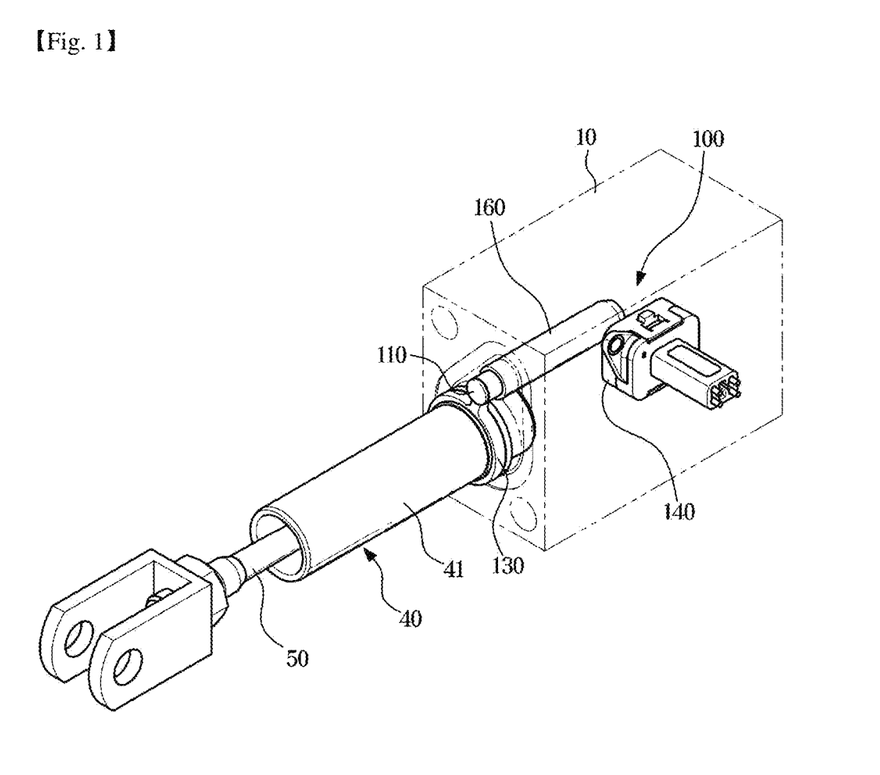
FIG. 1 is a perspective view illustrating an apparatus for sensing a displacement of a brake pedal mounted in a hydraulic block according to an embodiment.
Figure 2:
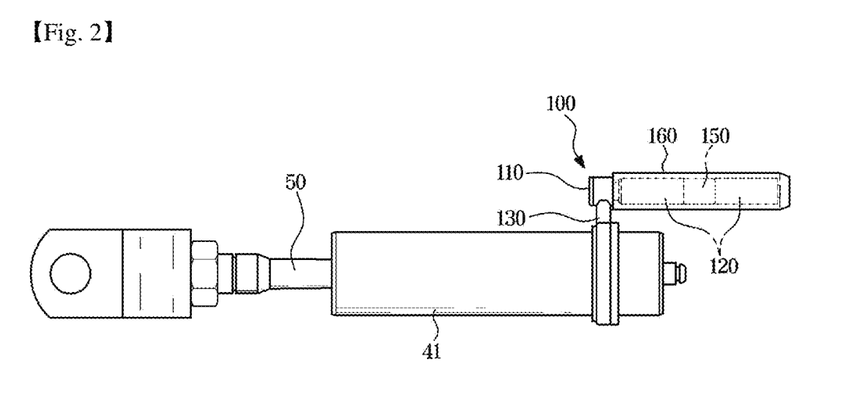
FIG. 2 is a side view illustrating a shaft and a magnet mounted on a piston of a master cylinder by a mounting member according to an embodiment.
Figure 3:
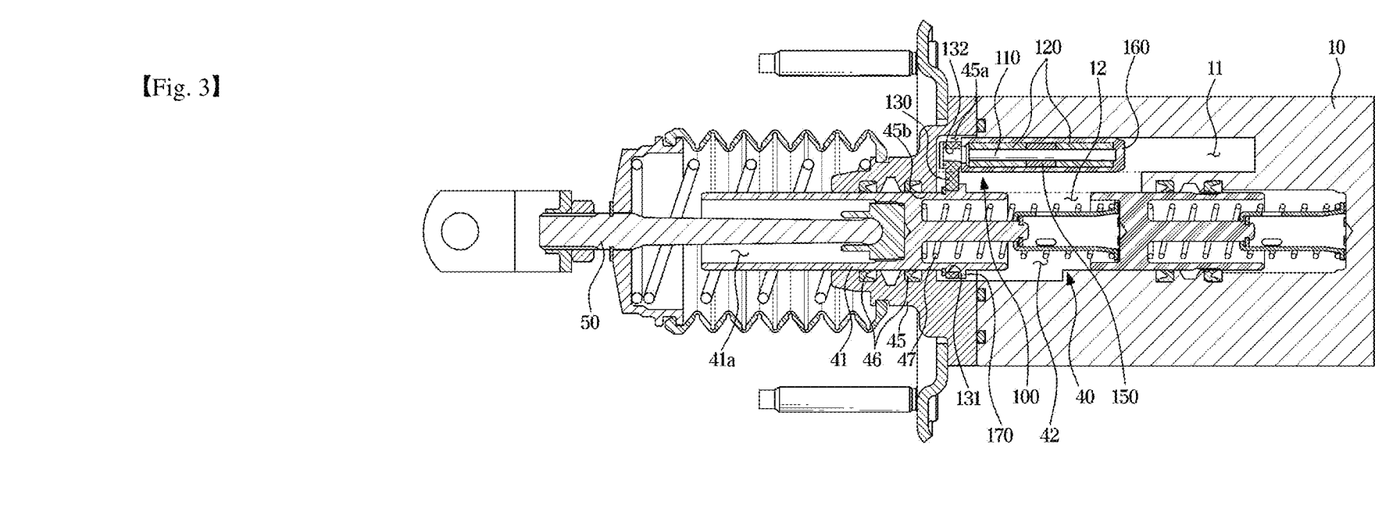
FIG. 3 is a side cross-sectional view illustrating an apparatus for sensing a displacement of a brake pedal mounted in a hydraulic block according to an embodiment.

FIG. 1 is a perspective view illustrating an apparatus for sensing a displacement of a brake pedal 100 mounted in a hydraulic block 10 according to an embodiment. FIG. 2 is a side view illustrating a shaft 110 and a magnet 120 mounted on a piston 41 of a master cylinder 40 by a mounting member 130 according to an embodiment. FIG. 3 is a side cross-sectional view illustrating an apparatus for sensing a displacement of a brake pedal 100 mounted in a hydraulic block 10 according to an embodiment.

Referring to FIGS. 1 to 3, the apparatus for sensing a displacement of a brake pedal 100 includes the shaft 110, at least one magnet 120, a cover member 160, the mounting member 130 and a sensor 140. The shaft 110 extends parallel to a movement direction of the piston 41 of the master cylinder 40 displaced by an operation of the brake pedal (not shown). The at least one magnet 120 is supported by the shaft 110. The cover member 160 covers the shaft 110 and the magnet 120. The mounting member 130 couples the piston 41 and the shaft 110. The sensor 140 detects a change in magnetic force of the magnet 120.

According to an embodiment, the apparatus for sensing a displacement of a brake pedal 100 may be mounted in the hydraulic block 10. The master cylinder 40, an electric control unit, and the like may be installed in the hydraulic block 10, and a plurality of passages and valve bores for controlling flow of a pressing medium such as brake oil, etc., that forms hydraulic pressure may be provided in the hydraulic block 10. Also, a cylinder bore 12 that receives the piston 41 of the master cylinder 40 and a shaft bore 11 that receives the shaft 110 and the magnet 120 may be provided in the hydraulic block 10. Besides the piston 41, an input rod 50 that connects the brake pedal and the piston 41 is received to be movable forward and backward, in the cylinder bore 12. The shaft 110 and the magnet 120 are received to be movable forward and backward in the shaft bore 11, together with the piston 41, which will be described in detail later.

The input rod 50 has one end connected to the brake pedal and another end coupled to the piston 41 through a hollow portion 41a formed inside of the piston 41, and thus an operation of the brake pedal is transmitted to a displacement of the piston 41.

The master cylinder 40 may include a housing 45, the piston 41 and a pressure chamber 42. The housing 45 that forms a body is mounted on one side of the hydraulic block 10, and the piston 41 connected to the brake pedal through the input rod 50 is provided to be displaceable inside the cylinder bore 12 according to the operation of the brake pedal. The pressure chamber 42 formed inside the cylinder bore 12 has a volume changed by the displacement of the piston 41, and thereby forming a hydraulic pressure of the pressing medium accommodated inside or a negative pressure.

The housing 45 may be fixed to the hydraulic block 10 and a vehicle body by a coupling member (not shown). Specifically, the housing 45 may be installed to cover one side of the hydraulic block 10 where the shaft bore 11 or the cylinder bore 12 is formed. Also, the housing 45 may include a receiving space 45a where at least a portion of the shaft 110 and the magnet 120 may be received and a through hole 45b through which the piston 41 passes. The receiving space 45a is formed to be recessed inside the housing 45 so that the at least a portion of the shaft 110 and the magnet 120 and one side of the mounting member 130 may be received. The through hole 45b is formed through in the movement direction of the piston 41, so that the piston 41 may move forward and backward, and a plurality of sealing members 46 are provided between the through hole 45b and the piston 41 to prevent leakage of the pressing medium.

Also, the piston 41 whose one end is connected to the brake pedal through the input rod 50 moves forward and backward inside the housing 45 and the cylinder bore 12 of the hydraulic block 10 according to the operation of the brake pedal by a driver, thus displacement may occur. Also, the other end of the piston 41 may be elastically supported by a piston spring 47.

When a pedal force is applied to the brake pedal by the driver, the piston 41 moves forward (a right side when viewed from FIG. 3), and thereby may reduce the volume of the pressure chamber 42 partitioned and formed by the cylinder bore 12. Accordingly, the pressing medium in the pressure chamber 42 is pressurized and hydraulic pressure may be formed. By contrast, when the driver releases the pedal force applied to the brake pedal, the piston 41 moves backward (a left side when viewed from FIG. 3) to its original position by the piston spring 47, and thereby may increase the volume of the pressure chamber 42. Accordingly, the hydraulic pressure of the pressing medium in the pressure chamber 42 may be released or negative pressure may be formed. The cylinder bore 12 may be formed through or formed to be recessed and at least a portion of the cylinder bore 12 communicates with the shaft bore 11 to be described later.

The piston 41 may include the hollow portion 41a empty inside and, an outer surface of the piston 41 may be provided with a flange part 170 extending outwardly. The flange part 170 is in contact with and supports one side of the mounting member 130 to be described later, and thus the piston 41 and the mounting member 130 may integrally move forward and backward. The flange part 170 may be provided and mounted as a separate constituent component, or integrally formed to simplify a manufacturing process.

Figure 4:
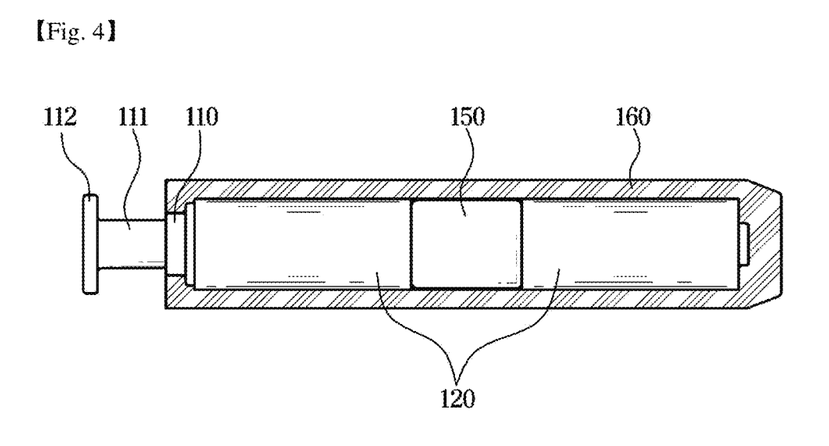
FIG. 4 is a cross-sectional view illustrating a shaft, a magnet and a cover member according to an embodiment.

FIG. 4 is a cross-sectional view illustrating the shaft 110, the magnet 120 and the cover member 160 according to an embodiment. Referring to FIGS. 1 to 4, the shaft 110 is coupled to the piston 41 by the mounting member 130 to be described later, and thereby may move together with the piston 41 according to an operation of a brake pedal. The shaft 110 may extend parallel to a movement direction of the piston 41, and be received in the shaft bore 11 of the hydraulic block 10 together with the magnet 120 to move forward and backward.

The shaft bore 11 may be connected to or communicate with the cylinder bore 12 in the hydraulic block 10, and thus the shaft 110, the magnet 120 and the cover member 160 may slide inside the shaft bore 11. Like the cylinder bore 12, the shaft bore 11 may extend parallel to the movement direction of the piston 41. Inside the hydraulic block 10, the cylinder bore 12 in which the piston 41 slides and the shaft bore 11 in which the shaft 110 and the magnet 120 slide are provided to be connected to or communicate with each other without being sealed. Accordingly, a separate sealing member for sealing a gap between the cylinder bore 12 and the shaft bore 11 is not required, and thereby may reduce a constituent component. Further, a manufacturing process for forming the cylinder bore 12 and the shaft bore 11 in the hydraulic block 10 may be simplified, and thereby may reduce a manufacturing cost and improve productivity. In addition, the cylinder bore 12 and the shaft bore 11 are formed to be close to each other in the hydraulic block 10, and thereby may reduce a size of the hydraulic block 10 and also reduce a size and weight of a product.

The shaft 110 may include a coupling groove 111 and a support part 112. The coupling groove 111 is formed to be recessed radially inwardly so that a second coupling hole 132 of the mounting member 130 to be described later is seated, and the support part 112 is in contact with one side of the mounting member 130 and supported. At least one magnet 120 may be installed on an outer circumferential surface of the shaft 110, and the at least one magnet 120 is made of a magnetic material. Because the piston 41 moves forward and backward according to an operation of the brake pedal to generate displacement, and the magnet 120 is also connected to and coupled to the piston 41 through the mounting member 130 and the shaft 110, the magnet 120 may move forward and backward together with the piston 41. The sensor 140 detects a change in magnetic force or a change in magnetic flux density of the magnet 120 according to the movement of the magnet 120, and thereby may detect a stroke of the brake pedal based on a displacement amount of the piston 41. The magnet 120 may be fixed to the outer circumferential surface of the shaft 110 by various methods such as press-fitting, bolting, bonding, etc. A pair of magnets 120 may be spaced apart from each other by a predetermined distance so that the sensor 140 may more precisely measure a displacement of the piston 41 and the stroke of the brake pedal based on a superposition value of the magnetic force or the magnetic flux density of the magnet 120.

When the pair of magnets 120 are provided, a gap between the plurality of magnets 120 is required to be formed to enable the sensor 140 to more precisely measure the superposition value of the magnetic force or the magnetic flux density by the pair of magnets 120. Accordingly, a gap forming member 150 may be provided between the pair of magnets 120 to form a gap. The gap forming member 150 is made of a non-magnetic material and may be supported by the shaft 110 between the pair of magnets 120.

The cover member 160 is provided to cover the gap forming member 150 and the magnet 120 mounted on the outer circumferential surface of the shaft 110. Because the shaft 110, the magnet 120 and the gap forming member 150 are received in the shaft bore 11 communicating with the cylinder bore 12 of the hydraulic block 10 and move, the shaft 110, the magnet 120 and the gap forming member 150 slide while exposed to a pressing medium. Accordingly, due to the cover member 160 that covers the magnet 120 and the gap forming member 150, friction between an inner circumferential surface of the shaft bore 11 and the magnet 120 and the gap forming member 150 may be prevented, and direct contact of the magnet 120 with the pressing media may be prevented, and thus durability of the product may be improved.

The mounting member 130 is provided to couple the piston 41 and the shaft 110 so that the piston 41 and the shaft 110 may be operated integrally. The mounting member 130 may include a first coupling hole 131 and the second coupling hole 132. The first coupling hole 131 is formed through one side of the mounting member 130 and the piston 41 is inserted into and fixed to the first coupling hole 131. The second coupling hole 132 is formed through another side of the mounting member 130 and the shaft 110 is inserted into and fixed to the second coupling hole 132. An inner circumferential surface of the first coupling hole 131 may be in close contact with the outer circumferential surface of the piston 41 to be coupled to each other. A portion of the mounting member 130 is in contact with and supported by the flange part 170 extending radially outwardly from the outer circumferential surface of the piston 41, and thereby may enable the piston 41 and the mounting member 130 to be operated integrally. Also, an inner circumferential surface of the second coupling hole 132 may be in close contact with an outer circumferential surface of the coupling groove 111 of the shaft 110 to be coupled to each other. A portion of the mounting member 130 is in contact with and supported by the support part 112 extending radially outwardly from an outer circumferential surface of an end of the shaft 110, and thereby may enable the shaft 110 and the mounting member 130 to be operated integrally. Accordingly, the piston 41 and the shaft 110 may be coupled to each other to be operated together.

The sensor 140 is installed on an outer surface of the hydraulic block 10 to be close to the shaft bore 11 in order to effectively detect and measure a displacement of the piston 41. The sensor 140 may be provided as a hall integrated circuit (Hall IC) installed on a printed circuit board (not shown) for detecting a change in magnetic force. Because the sensor 140 is installed on the outer surface of the hydraulic block 10 without a separate bore formed in the hydraulic block 10 or a separate mounting component, a separate space for mounting the sensor 140 is not required, and thereby may reduce a size of the hydraulic block 10 and improve a space utilization and design freedom of a vehicle.

Figure 5:
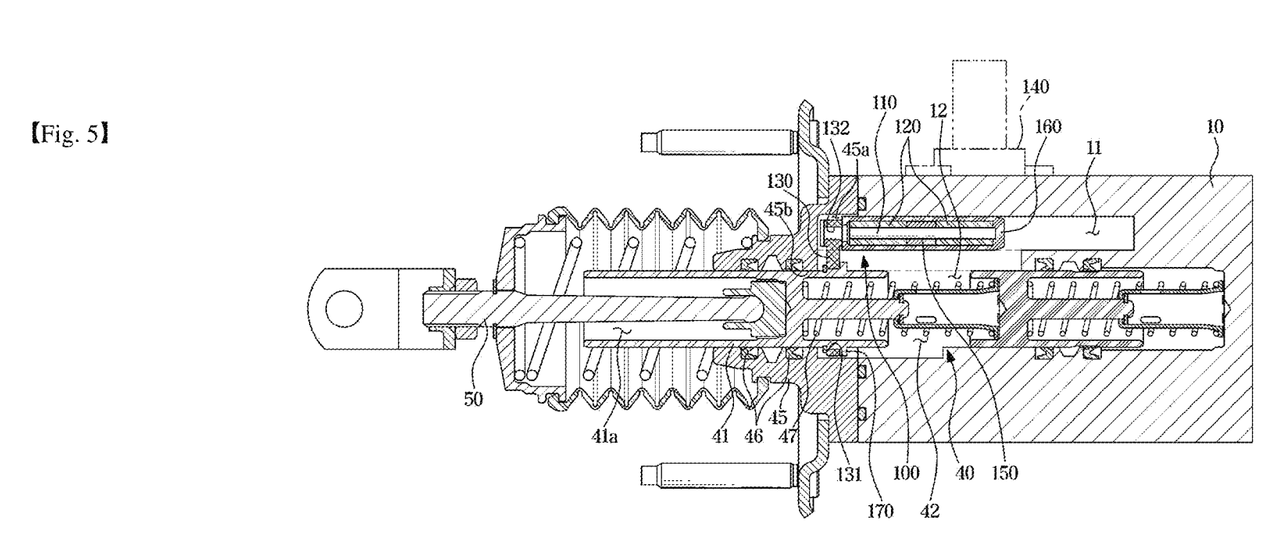
FIGS. 5 and 6 are diagrams illustrating operation states where a displacement of a brake pedal is measured by an apparatus for sensing a displacement of a brake pedal according to an embodiment.
Figure 6:
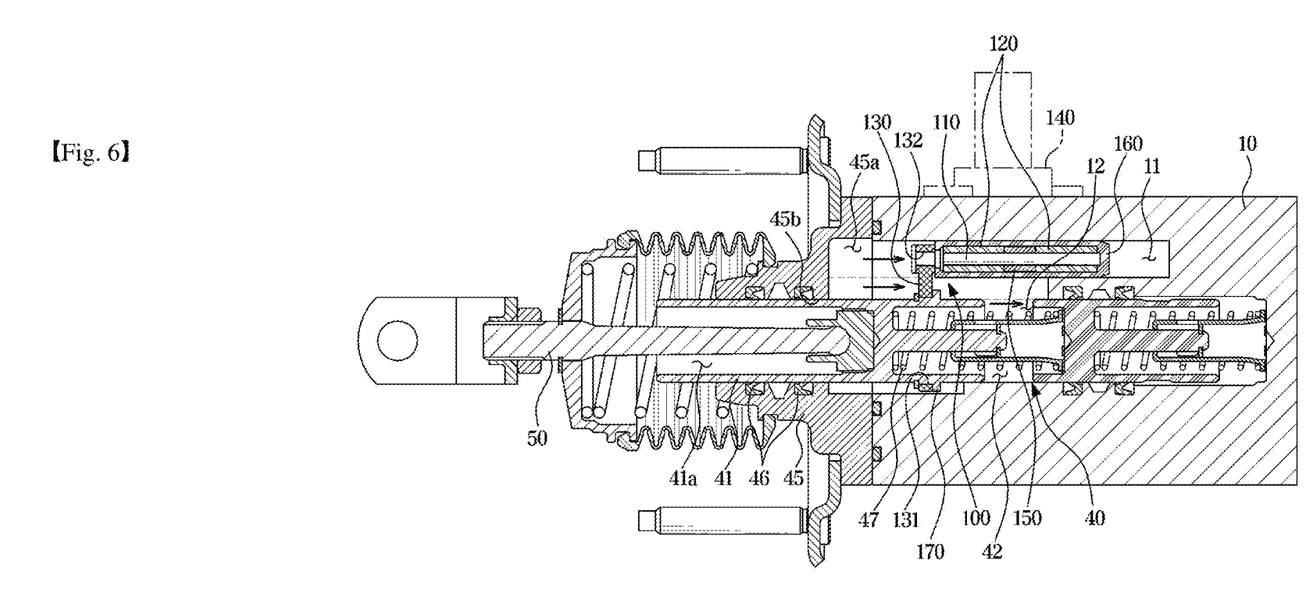

FIGS. 5 and 6 are diagrams illustrating operation states where a displacement of a brake pedal is measured by the apparatus for sensing a displacement of a brake pedal 100 according to an embodiment. FIG. 5 illustrates a state before a driver applies a pedal force to the brake pedal and FIG. 6 illustrates a state where the displacement occurs in the piston 41 due to the pedal force applied to the brake pedal.

Referring to FIGS. 5 and 6, once the driver applies the pedal force to the brake pedal for braking, the piston 41 connected to the brake pedal through the input rod 50 moves forward and thus the displacement occurs. Also, displacement occurs in the shaft 110 and the magnet 120 coupled to the piston 41 by the mounting member 130. As the piston 41 moves, the shaft 110 and the magnet 120 also move, causing a change in magnetic force or a change in magnetic flux density. The sensor 140 mounted on an outer surface of the hydraulic block 10 measures the change in magnetic force or the change in magnetic flux density due to a movement of the magnet 120, and thereby may detect the displacement of the piston 41. Accordingly, the displacement or stroke of the brake pedal may be measured and output based on the detected displacement of the piston 41.

The invention claimed is:

1. An apparatus for sensing a displacement of a brake pedal, the apparatus comprising:
    a shaft extending parallel to a movement direction of a piston of a master cylinder displaced by an operation of the brake pedal;
    a magnet supported by the shaft;
    a mounting member configured to couple the piston and the shaft; and
    a sensor configured to detect a change in magnetic force by the magnet,
    wherein the shaft and the magnet are accommodated in a shaft bore formed through or formed to be recessed in a hydraulic block including a plurality of passages and valves which control flow of a pressing medium, and
    the shaft bore communicates with a cylinder bore formed in the hydraulic block and receiving the piston,
    a cover member mounted on the magnet to cover the magnet and be slidable together with the magnet inside the shaft bore.

2. The apparatus of claim 1, further comprising:
    a housing provided on a side where the shaft bore and the cylinder bore are formed on the hydraulic block.

3. The apparatus of claim 2, wherein the housing comprises a receiving groove provided to receive at least a portion of the shaft or the magnet.

4. The apparatus of claim 1, wherein the mounting member comprises a first coupling hole formed through one side to which the piston is coupled, and a second coupling hole formed through another side to which the shaft is coupled.

5. The apparatus of claim 1, wherein a plurality of magnets are disposed in the movement direction of the piston, and
    the apparatus further comprises a gap forming member disposed between the plurality of magnets to form a gap between the plurality of magnets.

6. The apparatus of claim 5,
    wherein the cover member covers both the magnet and the gap forming member.

7. The apparatus of claim 4, wherein the shaft comprises a coupling groove where the second coupling hole is seated and a support part extending outwardly from one end of the coupling groove to support the mounting member.

8. The apparatus of claim 4, further comprising:
    a flange part extending outwardly from the piston to support the mounting member.

9. The apparatus of claim 8, wherein the flange part is provided integrally with the piston.

10. The apparatus of claim 3, wherein the housing comprises a through hole through which the piston passes.

11. The apparatus of claim 10, further comprising:
    a sealing member provided between the piston and the through hole.

12. The apparatus of claim 1, wherein the shaft bore extends parallel to the movement direction of the piston in the hydraulic block.

13. The apparatus of claim 1, wherein the sensor is mounted on an outer surface of the hydraulic block.

* * * * *